United States Patent

[11] 3,630,103

| | | |
|---|---|---|
| [72] | Inventor | Vladimire Viktorovich Idel<br>Gorkovsko, oblasti, ulitsa Graftio, 15, kv. 6, Zavolzhie, U.S.S.R. |
| [21] | Appl. No. | 10,392 |
| [22] | Filed | Feb. 11, 1970 |
| [45] | Patented | Dec. 28, 1971 |
| [32] | Priorities | Feb. 19, 1969 |
| [33] | | U.S.S.R. |
| [31] | | 1304934;<br>Mar. 4, 1969, U.S.S.R., No. 1308951 |

[54] METHOD AND A DEVICE FOR SETTING TEETH OF BAND AND DISK SAWS
7 Claims, 6 Drawing Figs.

[52] U.S. Cl. .................................................. 76/112, 76/58, 76/66
[51] Int. Cl. ....................................................... B23d 63/00
[50] Field of Search .......................................... 76/58, 66, 67, 61, 71, 112

[56] References Cited
UNITED STATES PATENTS
2,779,216  1/1957  Chenoweth .................. 76/66
FOREIGN PATENTS
1,071,446  12/1959  Germany ...................... 76/58

*Primary Examiner*—Bernard Stickney
*Attorney*—Waters, Roditi, Schwartz & Nissen

ABSTRACT: There is proposed a method for setting teeth of band and disk saws, whose essence resides in that impacts are imparted to one edge of each tooth in the direction of its bending away, and a device for effecting this method, wherein striking members having their working surfaces inclined to the side surface of the saw are arranged in such a manner that said working surfaces are inclined also to the plane of cross section of the saw, said plane lying perpendicular to the straight line connecting two apices of the neighboring working teeth of the saw.

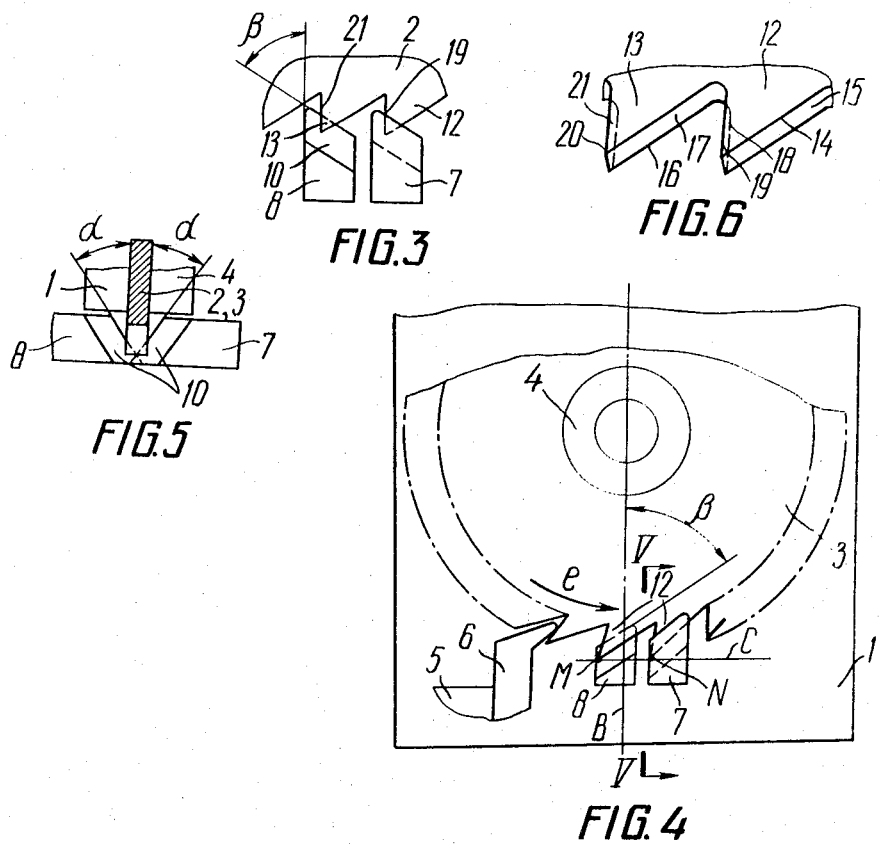

METHOD AND A DEVICE FOR SETTING TEETH OF BAND AND DISK SAWS

The present invention relates to a method of setting teeth of band and disk saws and to a device for its realization.

Widely known is a method of setting teeth of band and disk saws, according to which the side faces of the teeth near the apices thereof are subjected to impact.

The known device for realizing said method comprises two striking members with their working surfaces inclined to the side surface of the saw, which striking members are arranged at both sides of the saw for reciprocating towards each other, and anvils also having inclined working surfaces corresponding to the tooth of the saw.

The inclined working surfaces of the striking members is disposed perpendicular to the cross section plane of the saw.

The setting of saw teeth is effected by subjecting the teeth to impact produced by the striking members near the apices and on the side faces of the teeth bearing against the anvil.

As the striking member impart impacts to the side surface of the tooth, the latter is bent away only in one plane, and therefore features insufficient rigidity and is subject to great resistance when cutting. Saws with the teeth set by the above-described method are noted for their low strength and short life.

Moreover, if the angle at which the working surface of the striking member is inclined to the side surface is great (15°–45°), the striking member interacts with the tip of tooth, and there takes place the so-called "cold hardening" of the metal resulting in the tooth tip becoming blunt.

With an increased rate of setting (200–400 teeth per minute), due to high temperatures originating in the point of impact (400°–600° C.), the "hardening" of the metal on the tip of the tooth proceeds more intensively and leads to complete blunting of the cutting edge of the tooth.

An object of the present invention is to provide a method of setting teeth of band and disk saws and a device for bringing said method into effect, which will make it possible to enhance the rigidity of the saw teeth, to reduce their resistance when cutting, and thereby to increase the strength of the teeth and the service life of the saw.

It is also an object of the present invention to provide a method of setting teeth of band and disk saws and a device for the realization of said method, which will not only involve no adverse effect as to the cutting ability of the saw teeth, but even increase it to a certain extent.

The above and other objects are accomplished in that when setting teeth of band and disk saws by imparting impact to the teeth, according to the invention, the impacts are imparted to one edge of the tooth in the direction of its bending away.

In case only one setting operation is to be performed on the machine, it is expedient that the impacts be imparted to the edge of the front face of the teeth.

In case teeth are to be both set and sharpened simultaneously, the impacts should be imparted to the edge of the backface of the teeth.

In the device for setting teeth of band and disk saws by the above-described method, which comprises at least two striking members arranged at both sides of the saw for reciprocating movement towards each other and having their working surfaces inclined to the side surface of the saw, according to the invention, said striking members are disposed so, that their working surfaces are inclined to the plane of the cross section of the saw, which is perpendicular to a straight line connecting two apices of the neighboring working teeth of the saw.

The essence of the present invention resides in that, when an impact is produced on one edge of the front face of each tooth, the direction of such impact being that in which he tooth will bend away, the striking effort is distributed in the tooth body in such a manner that the latter is bent screwlike, and the side cutting edge of the tooth acquires an additional back angle which considerably diminishes resistance that will arise when cutting.

Moreover, greater rigidity of the tooth is provided due to its screwlike shape.

The arrangement of the striking members in the present device in such a way that their surfaces inclined to the side surface of the saw are also inclined to the plane of the cross section of the saw which lies perpendicular to the straight line passing through the two apices of the neighboring teeth of the saw allows a force to be applied to the tooth at an acute angle to its edge.

If an impact is imparted to the edge of the front face of the tooth, the tooth becomes bent in a screwlike fashion with a small radius, whereas if the edge of the backface is subjected to an impact, the tooth is bent away also with a small radius of bending.

With an impact being imparted to the edge of the backface of the tooth, the so-called "hardening" of the metal takes place. But, according to the method proposed herein, the working surface of the striking member during the impact contacts the tooth edge not in a single point, but along a line, and therefore the impact force is distributed along the line of contact. The impact results in the metal starting to flow along the edge towards the apex (top) of the tooth, and the hardening proceeds along the cutting edge of the tooth not only without any blunting thereof, but, on the contrary, adding to its enhanced sharpness.

For a better understanding of the present invention given hereinbelow is a detailed description of embodiments of the device according to the invention, in conjunction with the accompanying drawings, wherein:

FIG. 3 shows another version of the arrangement of striking members relative to the saw teeth;

FIG. 4 is a diagrammatic view of the device for setting teeth of a disk saw, as seen from the side of the saw;

FIG. 5 is a section taken along V—V in FIGS. 3 and 4;

FIG. 6 is a perspective view of saw teeth (on an enlarged scale);

Figure 1:
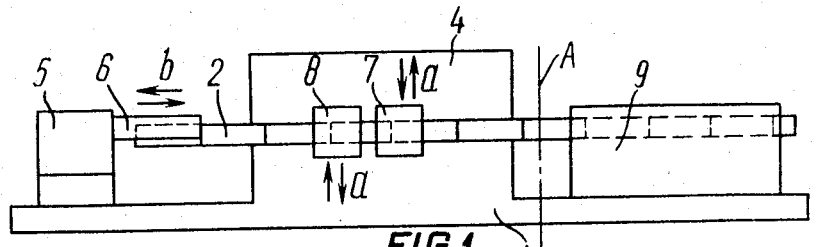
FIG. 1 is a diagrammatic view of the device for setting teeth of a bandsaw, as seen from the side of the saw teeth.
Figure 2:
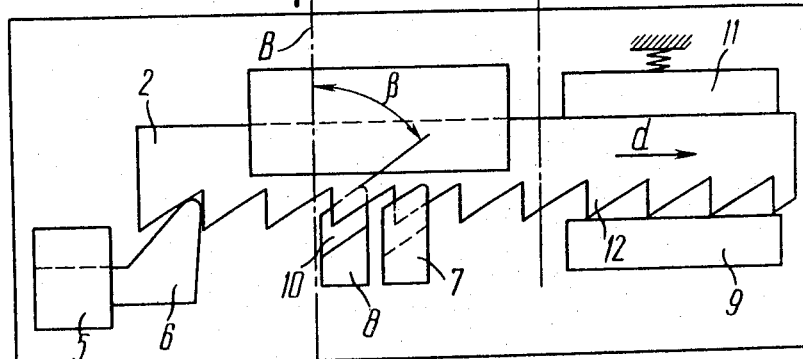
FIG. 2 is a top view thereof.

As be seen in the drawings, the device of the invention comprises a bed member 1 (FIGS. 1, 2, 4) onto which a bandsaw 2 or a disk saw 3 is positioned with its side surface, a hold down member 4, a feed mechanism 5 with a pawl 6, striking members 7 and 8 arranged at both sides of the bandsaw 2 or the disk saw 3, a rest member 9 adapted to orient the saw 2 with respect to working surfaces 10 of the striking members 7 and 8, and a spring-biased member 11.

The working surfaces 10 of the striking members 7 and 8 are inclined to the side surface of the saw 2 and 3 at an angle $\alpha = 45°$ (FIG. 5) and an angle $\beta = 75°$ (FIG. 2 and FIG. 3) to the plane A of the cross section of the saw 2 or to the plane B of the cross section of the saw 3, said plane lying perpendicular to the straight line C connecting two apices M and N of neighboring working teeth 12 and 13.

The herein-proposed method will now be considered for the case of setting the teeth of a bandsaw and a disk saw with the use of the above-described device.

The saw 2 or 3 is positioned with its side surface on the bed member 1 (FIGS. 1, 2, 4) and fixed from above by the hold down member 4.

The bandsaw 2 is additionally pressed against to the rest member 9 by means of the spring-biased member 11.

Then the saw 2 or 3 is fed stepwise in the direction indicated by arrow $d$ or $e$, and the striking members 7 and 8 are brought to their working position with respect to the saw teeth.

These preliminary operations having been completed, the striking members 7 and 8 start reciprocating (in the direction indicated by arrow $a$) towards the saw, producing impact on its teeth.

In case the striking members 7 and 8 are arranged in the device so that their working surfaces are inclined in the direction of the stepwise feed of the saw (as indicated by arrow $d$), the striking member 7 produces impact on the edge 14 (FIG. 6) of the backface 15 of the tooth 12, and the striking member 8 acts similarly upon the edge 16 of the backface 17 of the tooth 13 adjacent to the first-mentioned tooth 12.

In case the striking members 7 and 8 are arranged in the device so that their working surfaces 10 (FIG. 3) are inclined in a direction opposite to that of the stepwise feed of the saw, the striking member produces its impacts onto the edge 18 (FIG. 6) of the front face 19 of the tooth 12, and the striking member 8 acts similarly with respect to the edge 20 of the front face 21 of the tooth 13.

Due to the impacts produced by the striking members 7 and 8 against the edges of the front faces of the teeth of the unsharpened saw, the teeth thereof become bent in a screwlike fashion, whereby their rigidity and, hence, the strength and durability of the saw, are increased.

In case the saw teeth are to be set after it has been sharpened, the impacts of the striking members 7 and 8 are to be directed onto the edges of the backfaces of the teeth, so as not to impair the sharpness of their cutting edges. The rigidity of the teeth in this case is likewise increased due to the small bending radius of the tooth.

When the setting of one pair of teeth is completed, the striking members 7 and 8 are returned to their initial position, and the feed mechanism 5 with the help of the pawl 6 feeds the saw stepwise for the next pair of the teeth to be set.

The drives for bringing the pawl 6 of the mechanism 5 and the striking members 7 and 8 in reciprocation can be of any conventional construction which is suitable for the purpose.

What is claimed is:

1. A method of setting teeth of band and disk saws, said method comprising imparting impact force to the side face of a tooth to be set only along an edge of said side face to cause said tooth to bend away and twist.

2. A method as claimed in claim 1 wherein said impact force is developed by striking the tooth from one side only with an inclined surface making linear contact with the tooth along said edge.

3. A method as claimed in claim 1 wherein said impact is imparted to the front edge of the tooth.

4. A method as claimed in claim 1 wherein said impact is imparted to the back edge of the tooth.

5. A method as claimed in claim 1 comprising imparting the impact to two adjacent teeth at the same time on respective opposite faces of the teeth.

6. A device for setting teeth of band and disk saws, said device comprising at least two striking members having working surfaces inclined with respect to said faces of the saw, said striking members being arranged at both sides of said saw with means for reciprocatingly moving the striking members toward each other such that said working surfaces of said striking members are inclined to the plane of the cross section of said saw, the cross section plane lying perpendicular to a straight line connecting two apices of adjacent teeth of the saw.

7. A device as claimed in claim 6 wherein said working surfaces of said striking members are so inclined and disposed with respect to the teeth of the saw to contact each tooth at the time of impact along a line coinciding with an edge of a side face of such tooth to apply a force causing the tooth to bend away and twist.

* * * * *